US012306667B2

(12) United States Patent
Farahbod et al.

(10) Patent No.: US 12,306,667 B2
(45) Date of Patent: May 20, 2025

(54) SYSTEM, METHOD, COMPUTER PROGRAM, MOBILE DEVICE AND KIT FOR OPERATING A DEVICE WITH LOW COMPUTING POWER

(71) Applicant: tooz technologies GmbH, Aalen (DE)

(72) Inventors: Roozbeh Farahbod, Munich (DE); Ersun Kartal, Aalen (DE)

(73) Assignee: tooz technologies Gmbh, Aalen (DE)

( * ) Notice: Subject to any disclaimer, the term of this patent is extended or adjusted under 35 U.S.C. 154(b) by 47 days.

(21) Appl. No.: 17/438,216

(22) PCT Filed: Mar. 10, 2020

(86) PCT No.: PCT/EP2020/056378
§ 371 (c)(1),
(2) Date: Sep. 10, 2021

(87) PCT Pub. No.: WO2020/182825
PCT Pub. Date: Sep. 17, 2020

(65) Prior Publication Data
US 2022/0179448 A1 Jun. 9, 2022

(30) Foreign Application Priority Data
Mar. 12, 2019 (DE) .......................... 102019106281.0

(51) Int. Cl.
*G06F 1/16* (2006.01)
*G06F 9/455* (2018.01)

(52) U.S. Cl.
CPC .......... *G06F 1/163* (2013.01); *G06F 9/45537* (2013.01)

(58) Field of Classification Search
CPC .............................. G06F 1/163; G06F 9/45537
See application file for complete search history.

(56) References Cited

U.S. PATENT DOCUMENTS

| | | | |
|---|---|---|---|
| 9,164,919 B2 | 10/2015 | Jang et al. | |
| 2005/0246718 A1* | 11/2005 | Erlingsson | G06F 9/4411 719/317 |
| 2011/0093691 A1 | 4/2011 | Galicia et al. | |
| 2015/0340010 A1* | 11/2015 | Travers | G02B 27/017 345/520 |

(Continued)

FOREIGN PATENT DOCUMENTS

| | | |
|---|---|---|
| JP | 2011-186856 A | 9/2011 |
| JP | 2016-507970 A | 3/2016 |
| JP | 2016-126687 A | 7/2016 |

OTHER PUBLICATIONS

International Search Report from corresponding International Patent Application No. PCT/EP20/56378, dated Jun. 3, 2020.

(Continued)

*Primary Examiner* — Amit Chatly
*Assistant Examiner* — Chayce R Bibbee
(74) *Attorney, Agent, or Firm* — Renner, Otto, Boisselle & Sklar, LLP

(57) ABSTRACT

Systems, methods, computer programs and devices are provided where a virtual operating system application essentially operating a device with reduced computing power runs on a mobile device. The virtual operating system may allow running of applications for the further device or act as a proxy for the further device to be controlled by other applications running on the mobile device.

18 Claims, 3 Drawing Sheets

(56) References Cited

U.S. PATENT DOCUMENTS

2017/0244779 A1* 8/2017 Reichling ............ H04L 67/025

OTHER PUBLICATIONS

Chan, K., "Smart glasses that let you see your smartphone screen that is out of sight," Apr. 27, 2018, <web.archive.org>, retrieved Sep. 16, 2019.
Thoma, J., "Vmware: Virtuelle Maschinen für Android" (with English-language translation), <web.archive.org>, retrieved Sep. 16, 2019.
Search Report (with English-language translation) of German Priority Patent Application No. 102019106281.0 dated Sep. 16, 2019.
Office Action (with English translation) mailed Oct. 31, 2023 from related/corresponding Japanese Patent Application No. 2021-549447.
Office Action (with English translation) dated Jul. 15, 2024 from related/corresponding Chinese Patent Appl. No. 202080020410.6.
Office Action (with English translation) dated Aug. 9, 2024 from related/corresponding Korean Patent Appl. No. 10-2021-7031891.
Office Action dated Mar. 28, 2024 in related/corresponding European Patent Application No. 20710897.8.

* cited by examiner

SYSTEM, METHOD, COMPUTER PROGRAM, MOBILE DEVICE AND KIT FOR OPERATING A DEVICE WITH LOW COMPUTING POWER

CROSS-REFERENCE TO RELATED APPLICATIONS

This application is a national stage application, filed under 35 U.S.C. § 371, of International Patent Application No. PCT/EP2020/056378, filed Mar. 10, 2020, which claims priority to DE 10 2019 106 281.0, filed Mar. 12, 2019, each of which is incorporated by reference herein in its entirety.

FIELD OF THE INVENTION

The present application generally relates to operation of devices having a comparatively low computing power.

BACKGROUND OF THE INVENTION

Many devices are equipped with displays to display content and/or input devices allowing a user to make inputs. Such an input device may be combined with the display using a so-called touchscreen. Some of such devices, due to space or cost restraints, have only a comparatively low computing power available. For example, a display may be incorporated into glasses in so-called smart glasses, but due to space constraints in such smart glasses and also for weight considerations it is difficult to equip such smart glasses with high computing power. Nevertheless, it is desirable for example to provide various kinds of information to a user via such a device having a low computing power. Such devices with low computing power are also referred to as thin devices herein.

Several approaches exist to couple a comparatively small device with a mobile device like a smartphone or tablet for enhanced capabilities. For example, in smart watches, application programs (referred to as apps herein) are installed in the smart watch, and corresponding application programs are installed in the mobile device, and the apps communicate with each other to provide capabilities to the smart watch, for example access to the mobile device's multimedia files like music or videos, transferring calls from the mobile device etc.

However, this solution requires corresponding apps to be installed on the small device, which may not be possible in devices having very low computing power or otherwise not allowing installing apps.

Another conventional approach is using remote display techniques. In this case, content displayed on a mobile device like a smartphone or tablet is essentially mirrored to the device with low computing power and also displayed there. For example, Bluetooth or other wireless communication may be used for this screen mirroring. However, this technique also has some drawbacks. For instance, the device with low computing power and the mobile device usually have different screen sizes. Content shown on the mobile device is usually designed for the screen of the mobile device, and displaying the same content on another device may lead to unsatisfying results. Moreover, this approach may make it difficult to operate the mobile device essentially independent from the device with low computing power or, in other words, this solution may make using different applications on the device difficult.

SUMMARY OF THE INVENTION

According to an embodiment, a system is provided, comprising:

a mobile device including an operating system and a first interface,
a further device including a display and a second interface, wherein the mobile device further includes a virtual operating system application running under the operating system of the mobile device, wherein the virtual operating system application is configured to
   manage a connection between the mobile device and the further device via the first interface and the second interface,
   provide screen frames to the further device to be displayed on the display of the further device,
   receive and process inputs from the further device, and
   enable the execution of applications for the further device on the mobile device.

By running a virtual operating system for the device with low computing power on the mobile device, functionalities can be provided to the device with low computing power while still being able to operate the mobile device using other applications. In this way, applications tailored to the device with low computing power may be provided. Moreover, such applications may use both input (for example sensor input) from the device with low computing power and from the mobile device, for example sensors of the mobile device like GPS sensors.

The further device may have less computing power than the mobile device, i.e. be a "thin device" as explained above.

In some embodiments, the further device does not allow the installation and running of additional applications. For such further devices, applications may be run on the mobile device using the virtual operating system application, either within the scope of the virtual operating system, or as independent applications running alongside of the virtual operating system but communicating to the virtual operating system using inter-process communication mechanisms that may be provided by the operating system of the mobile device. Therefore, the virtual operating system may communicate with further applications on the mobile device.

The virtual operating system may also be configured to send commands and/or configuration information to the further device, such that the further device may be essentially fully operated from the mobile device.

The virtual operating system application in some embodiments enables communication of the applications with devices (components) of the mobile device, such that these devices may be used by the applications.

The virtual operating system application may be configured to receive screen content from the applications and to provide the screen frames to the further device based on the screen content.

The applications may include a navigation application.

The mobile device may be a smartphone or a tablet computer.

The further device may be smart glasses.

According to a further embodiment, a method is provided, comprising:

on a mobile device, running a virtual operating system application for a further device, wherein the virtual operating system application is:
   managing a connection between the mobile device and the further device via a first interface of the mobile device and a second interface of the further device,
   providing screen frames to the further device to be displayed on the display of the further device,
   receiving and processing inputs from the further device, and enabling the execution of applications for the further device on the mobile device.

The virtual operating system application may enable communication of the applications with devices (components) of the mobile device.

The virtual operating system application may send commands and/or configuration information to the further device.

The virtual operating system application may communicate with further applications on the mobile device, such that these further applications may e.g. send screen content to the further device or receive input from the further device via the virtual operating system.

The virtual operating system application may receive screen content from the applications and provide screen frames to the further device based on the screen content.

The applications may include a navigation application.

According to another embodiment, a computer program is provided, comprising a program code which, when executed on a processor, causes the method as explained above to be executed.

A storage medium, in particular tangible storage medium, comprising the computer program is also provided.

Furthermore, a mobile device having the computer program stored thereon is provided.

According to another embodiment, a kit is provided, comprising:

the computer program or the storage medium as explained above, and a further device to be operated using the virtual operating system application of the computer program.

With such a kit, a user may empower his or her mobile device to operate the further device by installing the computer program on the mobile device.

The further device may be smart glasses.

BRIEF DESCRIPTION OF THE DRAWINGS

In the following, to provide a more thorough understanding embodiments will be described referring to the attached drawings.

DETAILED DESCRIPTION OF THE INVENTION

In the following, various embodiments will be described in detail. It should be noted that these embodiments are given by way of example only and are not to be construed as limiting. Features from different embodiments may be combined to form further embodiments. Variations, modifications or details described with respect to one of the embodiments may also be applied to other embodiments and will therefore not be described repeatedly.

Before embodiments will be described in detail, some definitions of terms used in the following will be given.

A mobile device as used herein is a computing device which is designed to be carried around by a person. Consequently, such mobile devices have a weight below 2 kg, usually less than 1 kg or lower, and dimensions smaller than 50 cm·50 cm·2 cm, usually below. Typical mobile devices are smartphones or tablets. Many mobile devices have a touchscreen for displaying content and receiving user input, as well as other sensors like a GPS sensor. Mobile devices typically have a computing power sufficient to run various kinds of custom applications (apps). In embodiments, mobile devices typically run an operating system which allows the installation of additional such applications.

A device with low computing power, shortly referred to as thin device herein, is a device which has less computing power than the mobile device. Often, thin devices have only firmware and do not allow the installation of custom applications, i.e. additional applications which are not part of the programs absolutely necessary for operating the device, or, in other words programs not related to the core functionality of the device. Processors used in such thin devices are less powerful than processors used in mobile devices and may for example be comparatively simple microcontrollers or even simple logic circuits for handling basic input or output.

In embodiments, an operating system for the thin device runs as an application on the mobile device. This operating system will also be referred to as "virtual operating system application", as it does not run on the device for which it provides operating system functions (the thin device), but on another device (the mobile device). As will be explained in more detail, this allows installation of additional applications for the thin device and/or flexible use of the mobile device at least partially independent from the thin device in applications.

Figure 1:
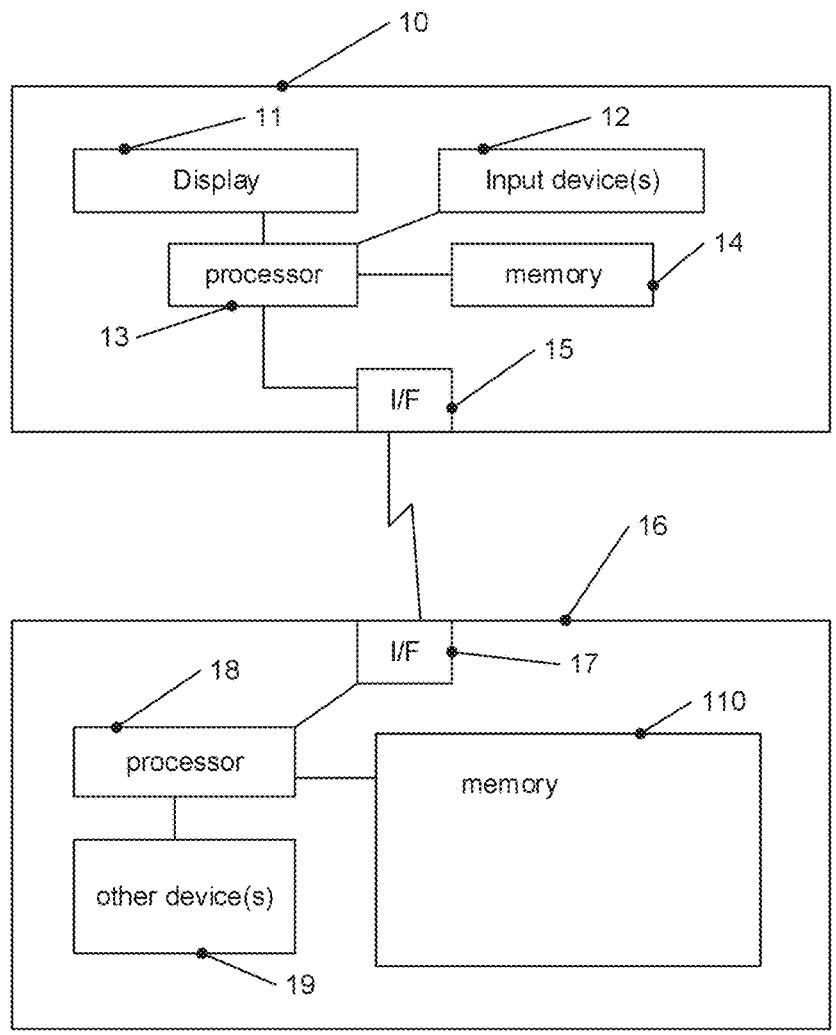
FIG. 1 is a block diagram of a system according to an embodiment.
Figure 2:
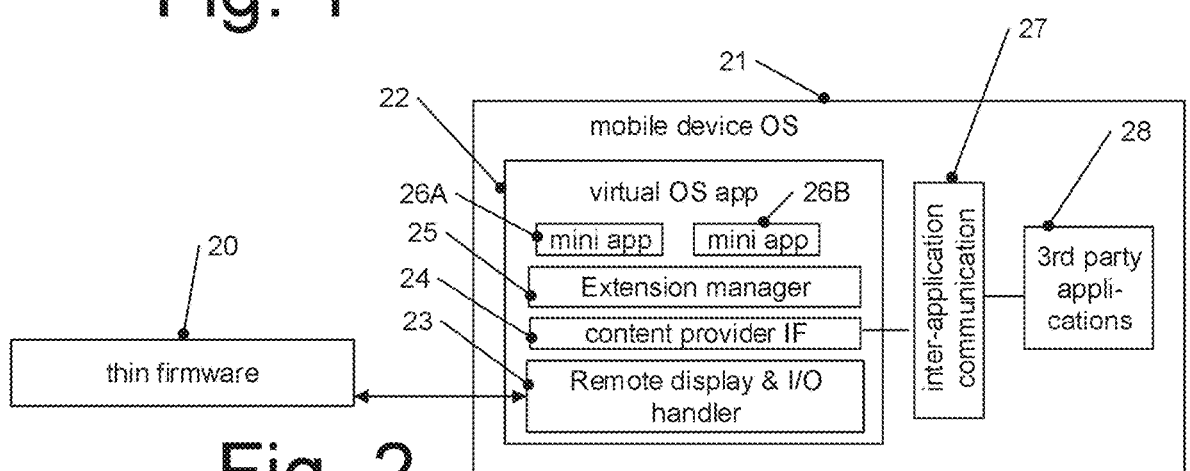
FIG. 2 is a block diagram illustrating an operating system structure of some embodiments including a virtual operating system.

FIG. 1 shows a system according to an embodiment, and FIG. 2 shows a logic diagram for further illustrating an operating system structure of the system of FIG. 1.

The system of FIG. 1 comprises a thin device 10 and a mobile device 16. Thin device 10 comprises a processor 13 coupled to a display 11, one or more input device(s) 12 and a memory 14. A processor, as used herein, is not limited to a single processor, but may also include the possibility of a plurality of processors being provided.

A display, as used herein, is any device which may be used for displaying content. For example, in case of the smart glasses mentioned initially a display may include a kind of projection system projecting content so that it may be viewed by a user of the glasses, or may comprise more conventional displays like TFT displays or liquid crystal displays. Input devices may be any devices which may allow user input. In some embodiments, an input device may be implemented by providing display 11 as so-called touchscreen. Other examples for input devices include camera sensors for sensing gestures of a person operating thin device 10 or a microphone for receiving voice command from the person. Memory 14 stores instructions for processor 13 necessary for operating thin device 10. In some embodiments, thin device 10 does not allow installation of custom applications in memory 14 or elsewhere in thin device 10.

Thin device 10 further comprises an interface 15 to communicate with mobile device 16. For this communication, mobile device 16 includes a corresponding interface 17. In the embodiment of FIG. 1, interfaces 15, 17 are wireless interfaces. One example for suitable wireless interfaces are Bluetooth interfaces. However, other kinds of wireless interfaces may also be used. Such interfaces are usually present in commercially available mobile devices like smartphones or tablets. Apart from the devices shown, thin device 10 may comprise other components, for example sensors.

Mobile device 16 comprises a processor 18, one or more other device(s) 19 and a memory 110.

Other devices 19 may include any devices conventionally used in mobile devices, e.g. smartphones or tablets, like sensors, for example GPS sensors, loudspeakers, microphones, displays, touchscreens, buttons or the like. Memory 110 comprises a writable memory like a flash memory, where custom applications may be installed. In the system of FIG. 1, one of these custom applications is a virtual operating system application which essentially provides an operating system to thin device 10. This concept will now be explained further referring to FIG. 2.

On the side of thin device 10, corresponding "thin firmware" 20 is provided. The thin firmware is a firmware on the thin device 10 which is essentially limited to provide various functions in thin device 10 necessary for operation of thin device 10. Furthermore, in mobile device 16, a virtual operating system application 22 is installed running under the normal operating system (OS) 21 of the mobile device. Thin firmware 20 interacts with this virtual operating system application 22 to provide various functionalities to thin device 10.

Thin firmware 20 has the function to pair and unpair the thin device to a mobile device, i.e. establish or terminate a wireless connection using interfaces 15, 17 in FIG. 1. Pairing, in particular for Bluetooth communications or other wireless applications, is a process where two devices are connected for the first time.

Furthermore, thin firmware 20 has the function to connect to and disconnect from the virtual operating system application 22 running on mobile device 16. Thin firmware 20 then receives screen frames from virtual operating system application 22 to be displayed on display 11 and sends user input from input device 12 or other data like sensor data to virtual operating system application 22. In some embodiments, upon request thin firmware 20 may also send device status of thin device 10 like battery status to virtual operating system application 22.

Therefore, thin firmware 20 sends input to virtual operating system application 22 (user input and/or other sensor input), and receives screen frames to be displayed from virtual operating system application 22.

Virtual operating system application 22 comprises a remote display and input/output handler 23 for providing screen frames to thin firmware 20 and receiving inputs from thin firmware 20. Furthermore, via remote display and input/output handler 23 commands and/or configuration information may be sent to thin firmware 20. Example commands may include screen on/off commands, audio capture on/off commands, a disconnect command etc. Example configurations may include a display turnoff time threshold, a display brightness, etc.

The inputs and outputs are further processed by a Content Provider Interface unit 24 which in one transmission direction (to thin firmware 20) translates screen content to a screen frame format to be transmitted via remote display and input/output handler 23 to thin firmware 20 and in the other transmission direction (from thin firmware 20) receives input from remote display and input/output handler 23 and makes them available to further components like applications or operating system parts. An extension manager 25 serves to manage installation/configuration/removal of mini apps running "on" the virtual operation system, of which two applications 26A, 26B (referred to as mini apps herein) are shown, and also may communicate with other devices (for example other devices 19) of mobile device 16, for example to provide sensor inputs from mobile device 16 to mini apps 26A, 26B. It should be noted that remote display and input/output handler 23, Content Provider Interface unit 24 and extension manager 25 are represented as separate components of virtual operating system application 22, but this is merely for convenience and to provide a better understanding of some functionalities provided by virtual operating system application 22, and they need not be implemented as separate components.

Mini apps 26A, 26B are applications designed for thin device 10 to provide additional functionalities to thin device 10. An example for such a mini app is a navigation app which allows navigation using the display 11 of thin device 10, or any other application for providing content on thin device, like a video player application. Mini apps 26A, 26B generally are applications which are installed in addition to the basic virtual operating system application 22 and may for example be provided by other vendors than virtual operating system application 22. In other words, extension manager 25 enables installation/configuration/removal of mini apps within the virtual operating system, and the Content Provider Interface unit 24 provides an interface to mini apps 26A, 26B and other applications 28 on the mobile operating system 21, to allow them access to inputs from thin firmware 20 or from other devices 19 of mobile device 16 and to allow them to modify the content displayed on display 11 of thin device 10.

Furthermore, virtual mobile operating system application 22 may communicate with further applications 28 (e.g. 3rd party applications) installed on the mobile device under mobile device operating system 21. Further applications 28 are independently developed mobile applications running on the mobile device that may use a communication interface 27 offered by mobile device operating system 21. Communication interface 27 generally serves for communication between applications under mobile device operating system 21. Such communication interfaces are usually provided by operating systems of mobile devices. Using communication interface 27 virtual mobile operating system application 22 may communicate with further applications 28. In this way, further applications 28 may receive sensor/user data from the thin device and send screen content to the thin device (when needed) without the need to directly connect to the thin device using the interface 17 of FIG. 1, but only communicating directly with virtual mobile operating system application 22.

Further applications 28 typically have their own independent user interface and business logic but in the above-explained way may also extend their user interaction model by sending content to the thin device and receiving input data from the thin device. Examples of such further applications 28 include sport activities apps (that e.g. may show sport-relevant information on the thin device and receive motion data from the thin device), navigation apps developed independently of the virtual operating system (but offer similar scenario as the navigation mini app), social networking and message apps, etc.

In some embodiments, thin device 10 may be provided together with virtual operating system application 22 as software (on a storage medium or for download) in a kit, such that a user can install the virtual operating system application on his or her mobile device (for example smartphone, tablet) to operate thin device 10.

Figure 3:
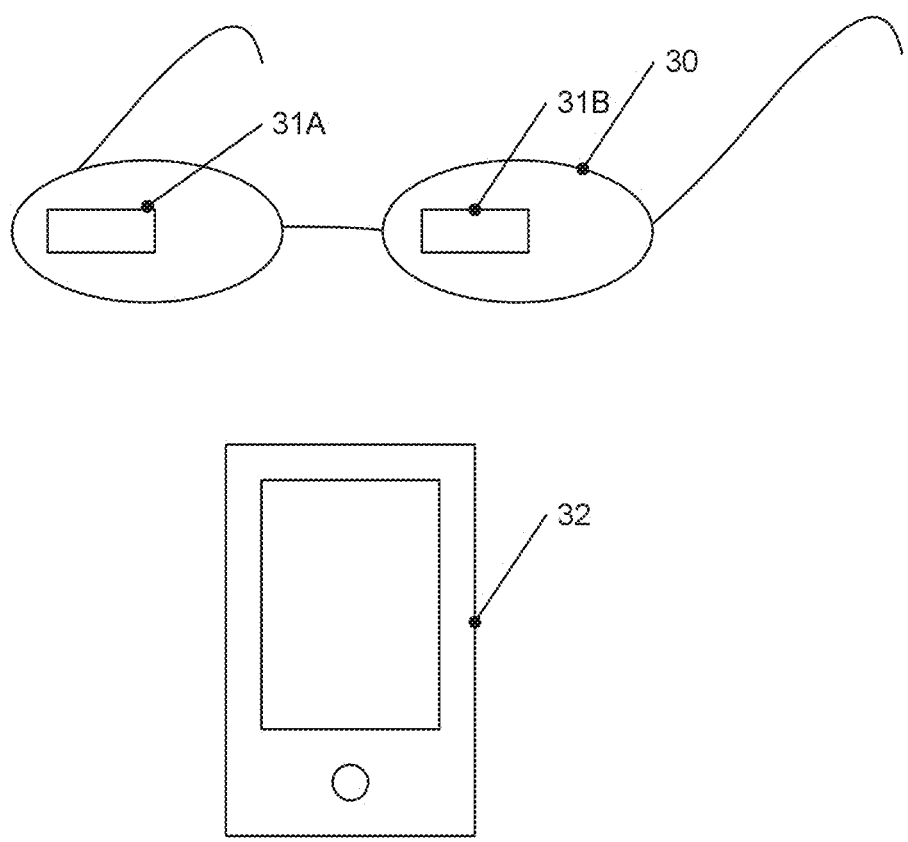
FIG. 3 is a diagram of a system according to a further embodiment.

FIG. 3 illustrates an example system to show an example for a thin device and a mobile device. In the example system of FIG. 3, a thin device is implemented as smart glasses 30, with display units 31A, 31B embedded in the glasses to show content to a person wearing smart glasses 30. The mobile device is implemented as smartphone or tablet 32.

Figure 4:
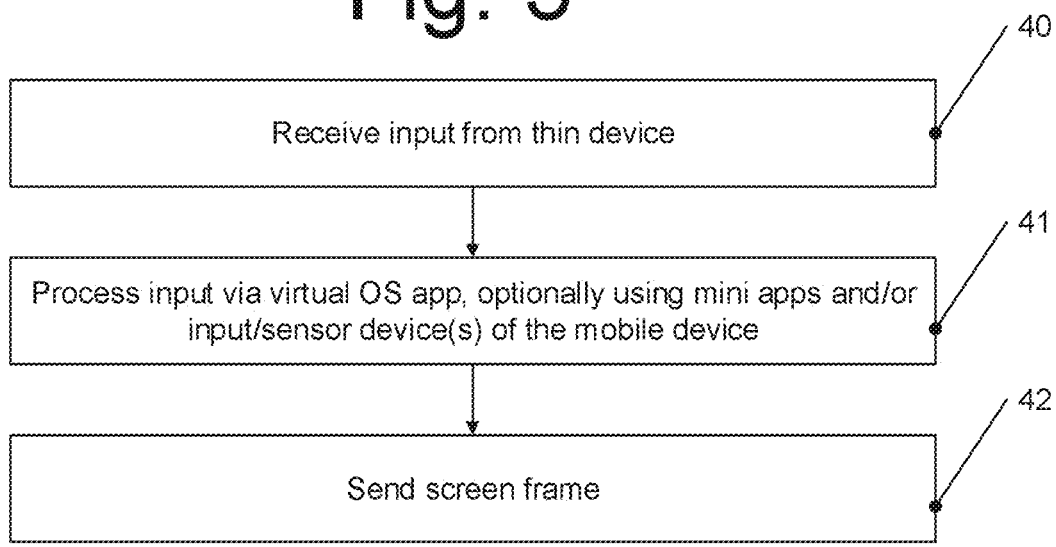
FIG. 4 is a flowchart illustrating a method according to an embodiment.

FIG. 4 is a flowchart illustrating a method according to an embodiment, which illustrates operating of a virtual operating system application.

It should be noted that while the method of FIG. 4 is illustrated as a series of steps, the order in which the steps are shown is not to be construed as limiting. In particular, some steps may be performed continuously.

At 40, the method comprises receiving input from a thin device at a mobile device, for example from sensors of a thin device detecting user input. At 41, the input is processed via the virtual operating system (for example 22 of FIG. 2), optionally using mini apps installed in the virtual operating system application and/or devices of the mobile device like sensors of the mobile device. At 42, the method comprises sending screen frames to the thin device to be displayed on the thin device. Additionally, as explained with reference to FIG. 2, commands or configuration information may be sent to the thin device.

Figure 5:
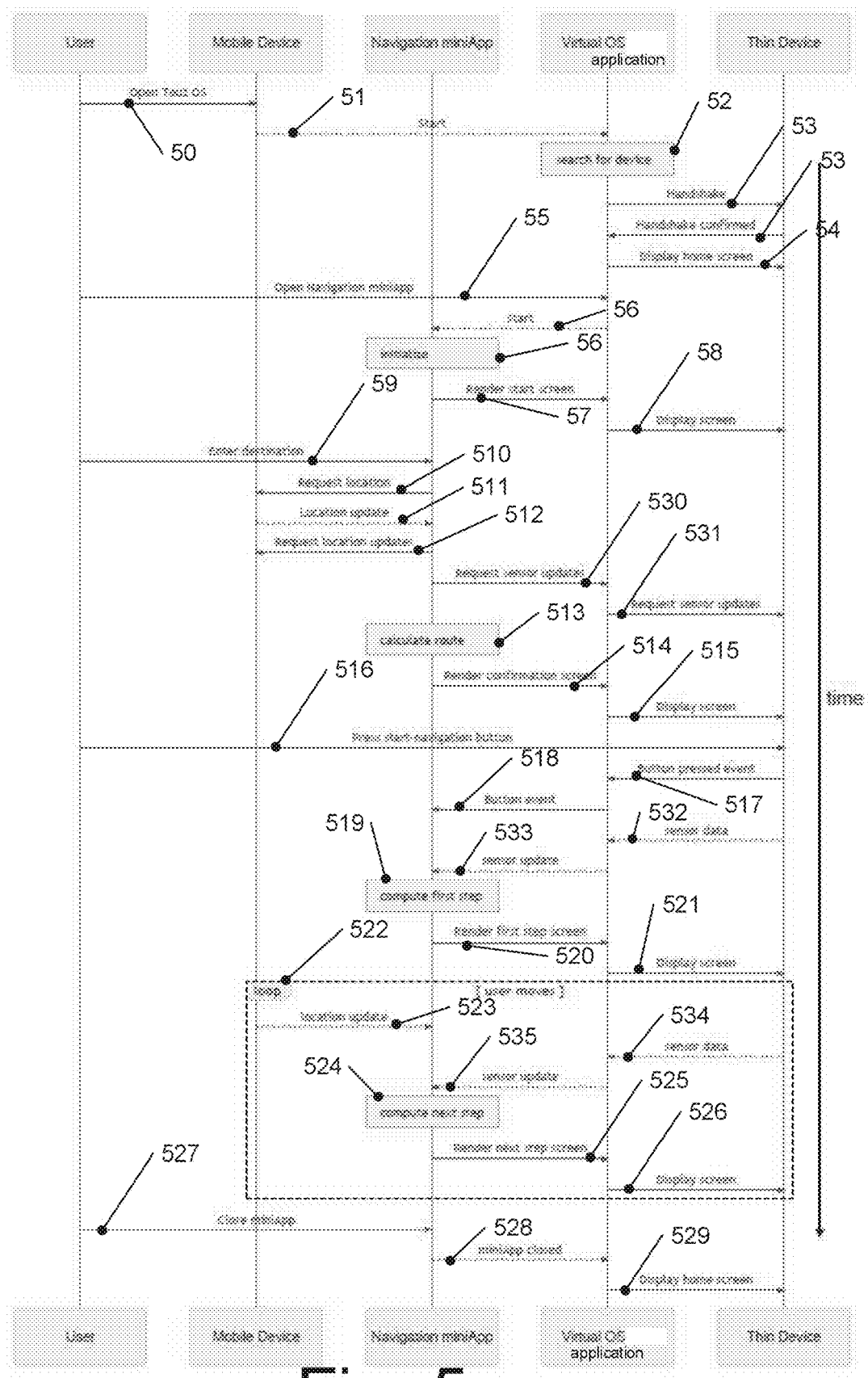
FIG. 5 is a diagram illustrating example operation of a system according to an embodiment for a particular application.

An example operation of the virtual operating system application and a mini app will now be explained referring to FIG. 5. In FIG. 5, it is assumed that a user has installed the virtual operating system on his or her mobile device and has a thin device, for example smart glasses 30 of FIG. 3, which has been paired to the mobile device.

Furthermore, it is assumed that the user has installed a navigation mini app on the virtual operating system application of the mobile device.

FIG. 5 shows, from top to bottom, an example time line how the thin device may be operated using the virtual operating system application and the navigation mini app installed thereon.

First, at 50, the user opens (starts) the virtual operating system application on the mobile device. The virtual operating system application then starts at 51 and searches for the thin device at 52. Then, communication is initiated for example using a handshake procedure 53, and a start screen frame, also referred to as home screen, is sent from the virtual operating system application to the thin device to be displayed at 54. At 55, the user then opens the navigation mini app running under the virtual operating system on the mobile device. After a start procedure and initialization of the navigation mini app at 56, a start screen of the mini app is rendered at 57 and transferred to the thin device as screen frame to be displayed at 58.

At 59, the user then enters a desired destination. In some embodiments, this may be done using an input device like a touchscreen of the mobile device. In other embodiments, this may be performed using some input device of the thin device like a microphone via which the destination is input via voice. The navigation mini app then requests the current location from the mobile device, for example using a GPS sensor of the mobile device at 510 and receives a location update at 511. Numeral 512 indicates that this update may be repeatedly performed.

As indicated at 530, 531, additionally update of sensor data from a sensor of the thin device (e.g. orientation sensor) may also be requested by the navigation mini app.

At 514, the navigation mini app then renders a confirmation screen, which at 515 is transmitted to the thin device as a screen frame to be displayed on the thin device.

At 516, the user then starts the navigation. In the embodiment of FIG. 5, this is done by pressing a button on the thin device. In other embodiments, this may be done by other actions on the thin device like a voice command or also an action using an input device of the mobile device. At 517, the thin device then reports to the virtual operating system application that the button was pressed, which the virtual operating system application at 518 provides to the navigation mini app. As indicated as 532, 533, the navigation mini app may also receive sensor updates (e.g. orientation sensor) from the thin device. Then, at 519, the navigation mini app calculates the first step (first instruction where to go or drive), and renders a corresponding screen at 520, which is provided to the thin device for displaying at 521. The navigation continues in a loop 522 during which the user moves, where at 523 the location is updated, at 524 a next step is calculated by the navigation mini app, a corresponding screen is rendered in 525, which is transmitted to the thin device to be displayed at 526. Prior to calculating the next step at 524, in some implementations the navigation mini app may also receive sensor updates (e.g. orientation sensor) from the thin device, as shown at 534, 535.

When the navigation is completed, at some point at 527, the user closes the navigation mini app, which then closes at 528. Following this, the home screen is transmitted to the thin device for displaying at 529, corresponding to the home screen transmitted to be displayed at 54.

It should be noted that the flow of FIG. 5 is only an example for illustrating a possible communication between the mobile device with the virtual operating system application and a mini app installed thereon and the thin device, and corresponding communication may also be performed for other kinds of mini apps.

What is claimed is:

1. A system, comprising:
a mobile device including an operating system and a first communication interface,
smart glasses including a display, a thin firmware and a second communication interface, wherein the smart glasses have less computing power than the mobile device and do not allow installing and running additional applications,
wherein the mobile device further includes a virtual operating system application running under the operating system of the mobile device, wherein the virtual operating system application is configured to
manage a connection between the mobile device and the smart glasses via the first communication interface and the second communication interface, and
provide screen frames to the smart glasses to be displayed on the display of the smart glasses,
wherein the thin firmware is configured to
pair and unpair the smart glasses to the mobile device using the first communication interface and the second communication interface in interaction with the virtual operating system application,
receive screen frames from the virtual operating system application to be displayed on the display of the smart glasses, and
send a user input or sensor data from the smart glasses to the virtual operating system application.

2. The system of claim 1, wherein the virtual operating system application enables communication of the applications with devices of the mobile device.

3. The system of claim 1, wherein the virtual operating system application is configured to receive screen content from the applications and to provide the screen frames to the smart glasses based on the screen content.

4. The system of claim 1, wherein the applications include a spatial navigation application.

5. The system of claim 1, wherein the mobile device is a smartphone or a tablet computer.

6. A system, comprising:
a mobile device including an operating system and a first communication interface,
smart glasses including a display, a thin firmware and a second communication interface, wherein the smart glasses have less computing power than the mobile device and do not allow installing and running additional applications,
wherein the mobile device further includes a virtual operating system application running under the operating system of the mobile device, wherein the virtual operating system application is configured to
manage a connection between the mobile device and the smart glasses via the first communication interface and the second communication interface,
provide screen frames to the smart glasses to be displayed on the display of the smart glasses, and
send configuration information to the smart glasses,
wherein the thin firmware is configured to
pair and unpair the smart glasses to the mobile device using the first communication interface and the second communication interface in interaction with the virtual operating system application,
receive screen frames from the virtual operating system application to be displayed on the display of the smart glasses, and
send a user input or sensor data from the smart glasses to the virtual operating system application.

7. The system of claim 1, wherein the virtual operating system application is configured to communicate with further applications on the mobile device.

8. The system of claim 7, wherein the further applications run under the operating system of the mobile device independently from the virtual operating system application.

9. A method, comprising:
on a mobile device having a first communication interface, running a virtual operating system application for smart glasses, the smart glasses including a display, a thin firmware and a second communication interface, the smart glasses having less computing power than the mobile device and do not allow installing and running additional applications, wherein the virtual operating system application is:
managing a connection between the mobile device and the smart glasses via the first communication interface of the mobile device and the second communication interface of the smart glasses, and—providing screen frames to the smart glasses to be displayed on the display of the smart glasses,
wherein the thin firmware is:
pairing and unpairing the smart glasses to the mobile device using the first communication interface and the second communication interface in interaction with the virtual operating system application,
receiving screen frames from the virtual operating system application to be displayed on the display of the smart glasses, and
sending a user input or sensor data from the smart glasses to the virtual operating system application.

10. The method of claim 9, wherein the virtual operating system application enables communication of the applications with devices of the mobile device.

11. The method of claim 9, wherein the virtual operating system application receives screen content from the applications and provides screen frames to the smart glasses based on the screen content.

12. The method of claim 9, wherein the applications include a spatial navigation application.

13. A method, comprising:
on a mobile device having a first communication interface, running a virtual operating system application for smart glasses, the smart glasses including a display, a thin firmware and a second communication interface, the smart glasses having less computing power than the mobile device and do not allow installing and running additional applications,
wherein the virtual operating system application is:
managing a connection between the mobile device and the smart glasses via the first communication interface of the mobile device and the second communication interface of the smart glasses,
providing screen frames to the smart glasses to be displayed on the display of the smart glasses, and
sending configuration information to the smart glasses,
wherein the thin firmware is:
pairing and unpairing the smart glasses to the mobile device using the first communication interface and the second communication interface in interaction with the virtual operating system application,
receiving screen frames from the virtual operating system application to be displayed on the display of the smart glasses, and
sending a user input or sensor data from the smart glasses to the virtual operating system application.

14. The method of claim 9, wherein the virtual operating system application communicates with further applications on the mobile device.

15. A non-transitory computer-readable medium comprising a program code which, when executed on a processor, causes the method of claim 9 to be executed.

16. A kit, comprising:
the non-transitory computer-readable medium of claim 15, and
smart glasses to be operated using the virtual operating system application of the program code.

17. The system of claim 1, wherein the virtual operating system is further configured to manage the connection by establishing communication with the smart glasses.

18. The method of claim 9, wherein managing the connection includes at least establishing communication with the smart glasses.

* * * * *